United States Patent [19]
Saliga

[11] Patent Number: 5,038,023
[45] Date of Patent: Aug. 6, 1991

[54] SYSTEM FOR STORING AND MONITORING BAR CODED ARTICLES SUCH AS KEYS IN A DRAWER

[75] Inventor: Thomas V. Saliga, Tampa, Fla.

[73] Assignee: C. Itoh Information Systems Development, Inc., Tokyo, Japan

[21] Appl. No.: 373,039

[22] Filed: Jun. 28, 1989

[51] Int. Cl.⁵ .................. G06F 15/24; G06K 13/00; G06K 7/00; H01J 5/16
[52] U.S. Cl. .................. 235/385; 235/383; 235/440; 235/456; 235/466; 250/237 G
[58] Field of Search ............ 235/383, 385; 340/568, 340/570, 572; 250/237 G

[56] References Cited
U.S. PATENT DOCUMENTS

| | | | |
|---|---|---|---|
| 527,589 | 10/1894 | Bristol | 340/570 |
| 4,259,569 | 3/1981 | Passer et al. | 235/476 |
| 4,454,413 | 6/1984 | Morton, Jr. | 235/383 |
| 4,549,170 | 10/1985 | Serres et al. | 340/568 |
| 4,595,922 | 6/1986 | Cobb et al. | 340/568 |
| 4,636,634 | 1/1987 | Harper et al. | 235/385 |
| 4,639,875 | 1/1987 | Abraham et al. | 235/385 |
| 4,661,806 | 4/1987 | Peters et al. | 340/568 |
| 4,667,099 | 5/1987 | Arai et al. | 250/237 G |
| 4,786,803 | 11/1988 | Majette et al. | 250/237 G |
| 4,839,875 | 6/1989 | Kuriyama et al. | 235/385 |
| 4,866,255 | 9/1989 | Sing | 235/385 |
| 4,866,661 | 9/1989 | de Prins | 235/383 |

Primary Examiner—Stuart S. Levy
Assistant Examiner—Edward H. Sikorski
Attorney, Agent, or Firm—Duckworth, Allen, Dyer & Doppelt

[57] ABSTRACT

A secure storage system for keys or similar articles has an locked storage module with a drawer. A horizontal drawer shelf holds a plurality of cards in numbered slots. Each card has a self-clocking bar code ID number that is scanned by a fixed optical reader as the drawer is opened or closed. A computer connected to the module stores in memory the key number and slot location of each stored key whenever the drawer is opened and closed. An authorized user enters his authorization code and a desired key number into the computer which unlocks the storage module. The computer displays the slot location of the requested key, inventories the keys and maintains records of all transactions.

14 Claims, 5 Drawing Sheets

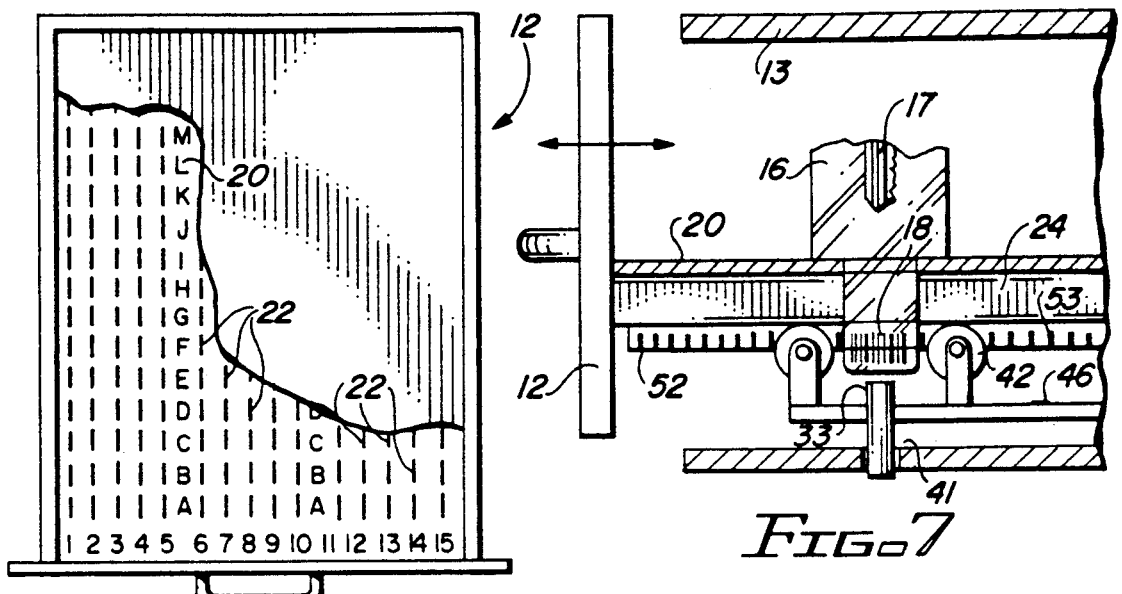
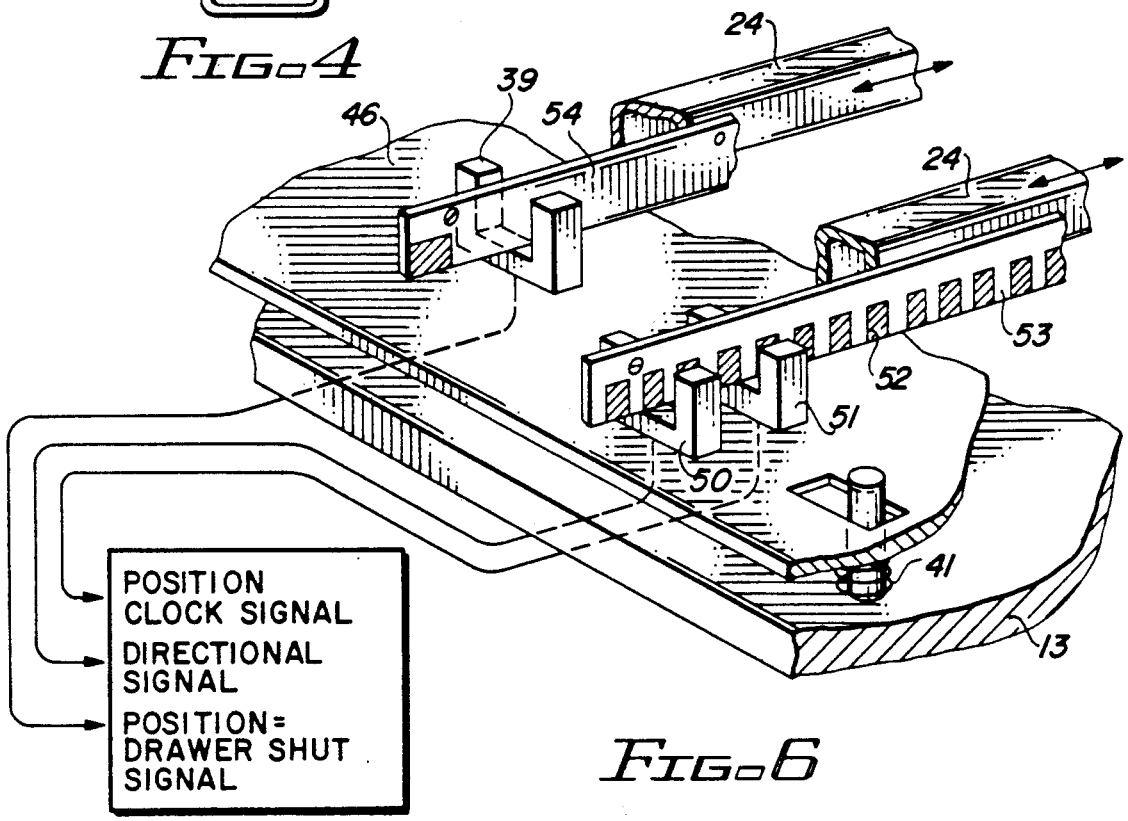
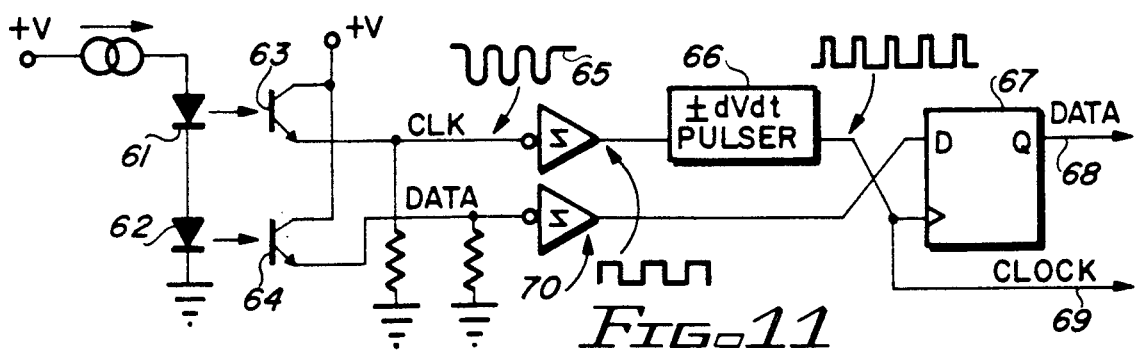

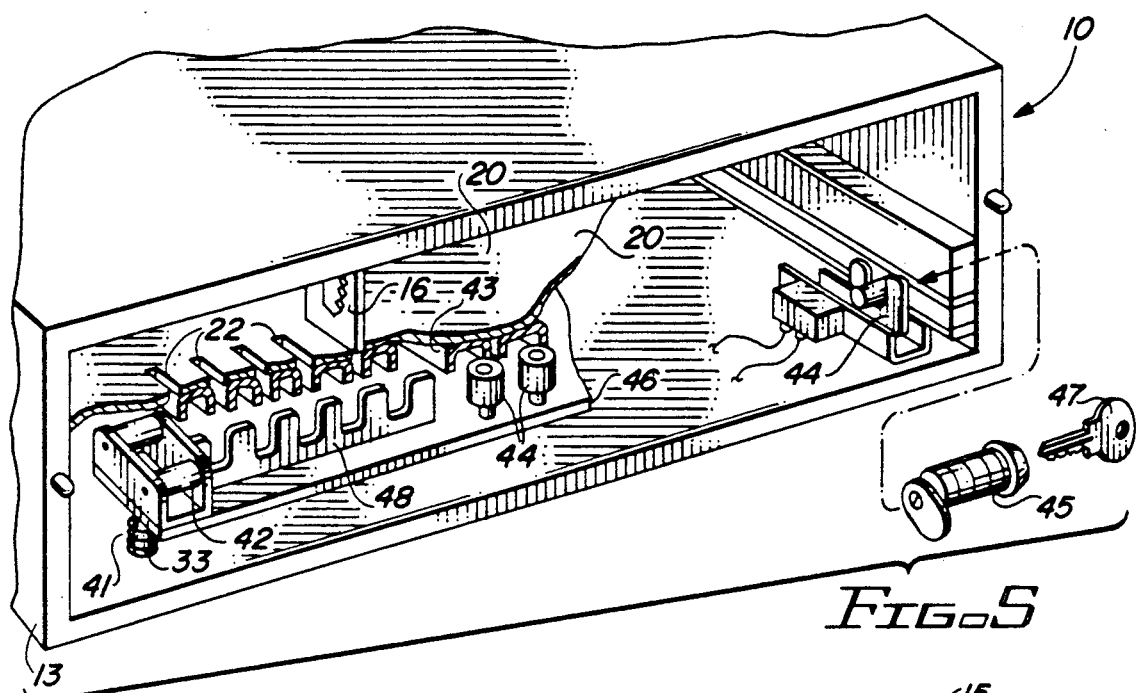
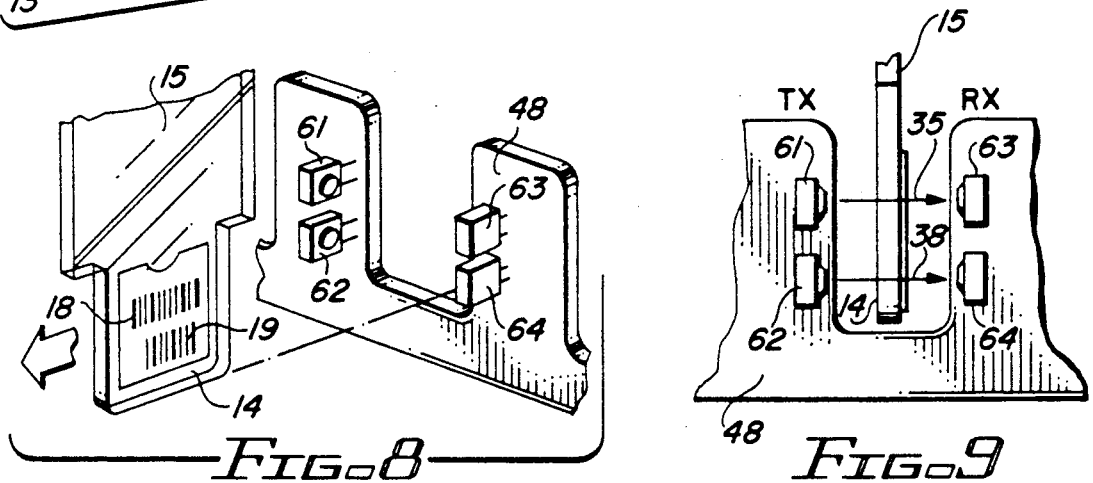
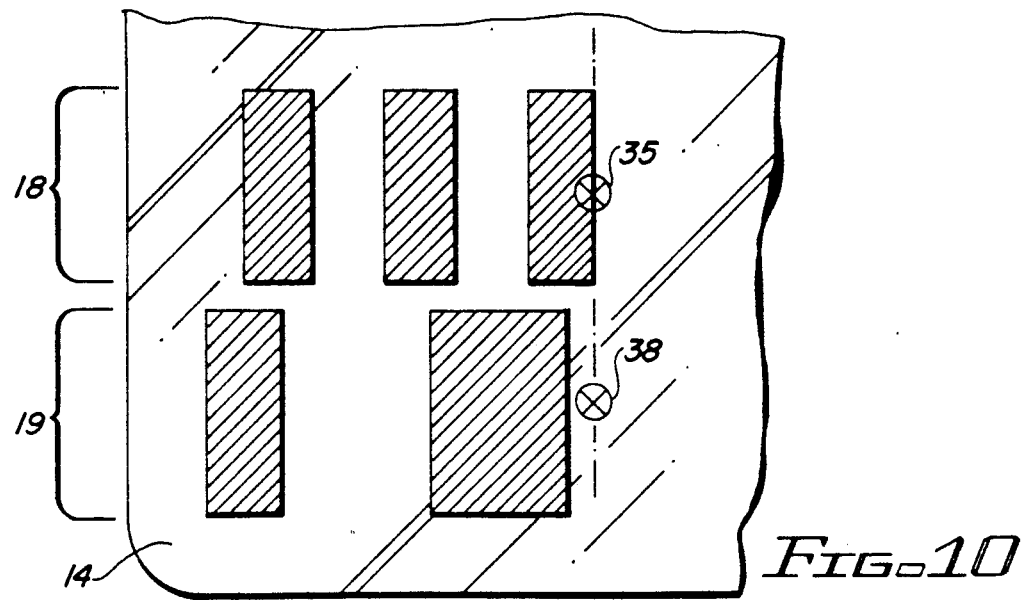

SYSTEM FOR STORING AND MONITORING BAR CODED ARTICLES SUCH AS KEYS IN A DRAWER

BACKGROUND OF THE INVENTION

1. Field of the Invention

The present invention relates to systems and methods for controlling a plurality of keys and similar articles, and more particularly to a system for storing keys, providing access to the keys by authorized personnel, and recording access to and return of keys.

2. Description of the Prior Art

Many businesses and organizations utilize a number of keys that must be controlled and accessed. For example, auto dealerships must carefully monitor, issue and control the keys to new and used cars. Salespersons must have ready access to such keys to be able to make sales. However, many dealerships have little or no foolproof procedures to determine who checked out a key, to insure return of a key, and to prevent unauthorized use of a key. As a result substantial key losses can occur as well as theft of vehicles. Poor key control by auto dealers has been cited as a basis for rapidly rising insurance rates.

An ideal key monitoring and control system requires that the keys be stored in a secure cabinet or the like; that access to such storage be convenient and only available to authorized personnel; and that a record be automatically made of the identity of the individuals, and the times of check-out and check-in of keys.

A number of patents in the prior art have approached this problem. Cobb, in U.S. Pat. No. 4,595,922 discloses a microprocessor based system. Keys are held on binary coded cards plugged into edge connectors on a panel. The microprocessor scans the panel and stores the location of each key. A desired key may be found by entering a user code and the number of the desired key. An indicator lamp is activated next to the desired key. No means for preventing unauthorized persons from removing keys is provided, except to initiate an alarm after a key is removed. Cobb in later U.S. Pat. No. 4,783,655 adds a printed record to his '922 patent system. In U.S. Pat. No. 4,635,053, Bourke et al. teach a microprocessor controlled for providing authorized access to items stored in receptacles. A user identifies himself at a console and the item desired. An indicator lamp shows the item location and a retaining latch releases the item. Means for recording details of a transaction is provided.

Peters et al, in U.S. Pat. No. 4,661,806, describe a computer controlled key management system. A key and keyholder is inserted into a storage container having a coded mating structure and which latches the holder in place. A system data processor controls access to the keys and maintains records of key usage.

Other prior art patents that disclose key or item storage systems include the following U.S. Pat. Nos.: 2,971,806; 3,451,043; 4,199,067; 4,549,170; 4,609,780; 4,673,915; and 4,681,504.

SUMMARY OF THE INVENTION

The present invention provides a management and control system and method in which the keys or similar articles are maintained in closed and locked drawers which can be opened by a computer/controller only by authorized personnel. A novel storage board in a drawer permits a large volume of articles to be stored in a small space.

Generally, the present invention contemplates a system and method for storing a plurality of articles and monitoring the removal and return of the articles. The method includes the steps of providing a storage facility having a plurality of storage locations and means for opening and closing the facility affixing a machine-readable element to each article, each machine-readable element having an address unique to a specific article; positioning each article and its associated element in one of the storage locations in the facility; and reading all of the machine-readable elements with a machine when the facility is being opened or closed so as to inventory all of the articles and to identify each article with a specific location in the facility. Preferably, the facility includes a drawer movable between an open position with the articles available for removal and a closed position with the article stored in the facility, with the machine reading the elements when the drawer is moved between the open and closed position.

Suitably, each article is attached to a small plastic card having a tab on one end thereof. The tab includes a dual track bar pattern having an opaque bar code along an outer end and an opaque clocking pattern spaced from the bar code. A drawer module includes a case with a drawer having a horizontal shelf therein. The shelf has a plurality of slots oriented in the direction of movement of the drawer. Each slot accepts the tab portion of one card such that the tab projects below the shelf. The pattern of slots is identified by a set of x-y coordinates such that a user may identify the location of each card.

The drawer is maintained closed by an electrical lock which is released by an authorized user as described below. When access to an article is made, the user opens the drawer. A set of optical scanners for each longitudinal row of slots is disposed below the front edge of the drawer shelf. As the drawer is opened, the tab on each card is scanned due to the movement of the drawer. Electronic circuits accept a sequence of clock pulses from the clocking pattern on each tab and decode each individual bar code. The self-clocking action makes the system independent of the velocity of movement of the drawer.

A computer system having a keyboard and monitor, which may be of the PC type, is utilized for controlling access to the drawer as well as for determining authorized users, logging articles in and out, and maintaining use records. A keyboard permits entry of user identifications. Alternatively, a magnetic stripe card reader may be used for entry of user identifications. The electronic circuits of the storage module are connected to the computer system.

When the drawer of the storage module is being withdrawn, the bar codes of each card in a slot is read by the electronics, placed in the computer memory and stored on a hard disk. A velocity independent drawer position optical system in the module produces an x-y location for each card bar code that is stored by the computer. As will be recognized, any article may be stored in any slot since the location memory will be refreshed each time the drawer is opened.

As will now be apparent, when an authorized person requires an article in the drawer, he enters his identification into the computer. The computer verifies the user's authority and unlocks the drawer. The user then enters the identification of the desired article. The x-y location of that article will be displayed on the computer monitor. The user withdraws the drawer and locates the desired article by reference to row and column markings on the shelf. The user removes the article and closes the drawer.

As the drawer closes, the remaining article tabs are read and the computer memory is refreshed to delete the removed article. The computer then stores the user identification, key number checked out, and the date and time of the transaction. When an article is returned it may be placed in any vacant slot, and the record corrected to show that article as now available and its location A permanent record of the transaction is maintained. A data printout may be obtained giving a manager information on all personnel activity. Control of such reports can be protected and limited to management of an organization.

It is therefore a principal object of the invention to provide a secure storage system for articles such as keys that limits access to authorized personnel, and that includes record keeping means for maintaining records of all personnel use of the keys.

It is another object of the invention to provide a computer controlled key storage system in which all articles are accessible only to personnel having proper authorization, in which the computer is programmed to unlock the storage drawer, identify the location of a desired article, and to maintain permanent records of all check-outs and check-ins.

It is yet another object of the invention to provide a storage cabinet having a drawer for articles and the like mounted on plastic cards with each card having a self-clocking bar code thereon. Upon manual opening or closing of the drawer, electronic circuits are caused to scan the bar codes and store the location of each card in an electronic memory.

It is another object of the invention to provide a method of storing and dispensing articles (such as keys) only to authorized personnel, and for maintaining a record of the location of each article, the user, date and time of each check-out and check-in, and for providing printed reports of such records.

It is another object of the invention to provide a method of random storage of article for automatically scanning all stored articles when a storage module is accessed to determine the location of each stored article, and for displaying the location of a desired article.

These and other objects and advantages of the invention will be apparent from the following detailed description when read with reference to the drawings.

BRIEF DESCRIPTION OF THE DRAWINGS

FIG. 4 is a top view of the drawer of FIG. 1 with a partial view drawer shelf;

FIG. 5 is a perspective view of the drawer case of FIG. 1 showing a partial view of the drawer and an optical reader card attached to the case;

FIG. 6 is a schematic diagram of a drawer position sensing system for the drawer module of FIG. 1;

FIG. 7 is a cross-sectional view of a portion of the drawer module showing elements of the optical reading system;

FIG. 8 and FIG. 9 are views of the key card scanning elements;

FIG. 10 shows a portion of the bar code tab of a key card showing the location of the scanning beams;

FIG. 11 is a simplified schematic diagram of one of the clocking and scanning electronic circuits for scanning of the key card bar codes;

DETAILED DESCRIPTION OF THE PREFERRED EMBODIMENT

Figure 1:
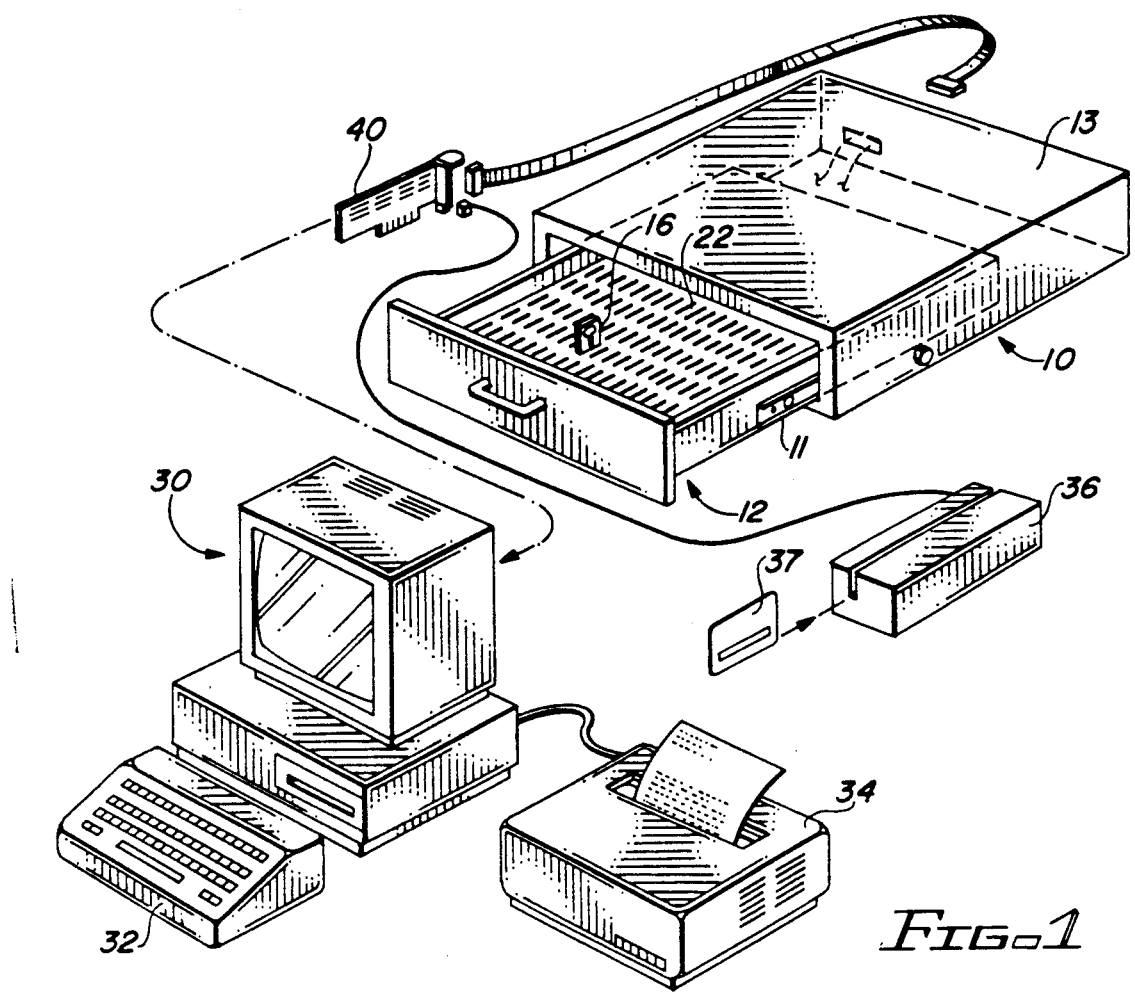
FIG. 1 is a perspective view of the major elements of the present invention.

Referring to FIG. 1, the primary elements of the storage and control system are shown in use with keys to be controlled. A storage module 10 includes a case 13 and a drawer 12, supported in case 13 by a roller assembly 11 that permits drawer 12 to be fully opened. A key shelf 20 within drawer 12 contains a plurality of columns and rows of slots 22. Each slot accepts a key card 16 to which a key is attached As will be described in detail hereinafter, case 13 contains electronic circuits for identifying each key card and its location.

A computer system 30 having a monitor, hard disk, and floppy disk is provided. The electronics circuits in module 10 are connected to a card 40 which is installed in an expansion slot of computer 30. The card also supplies protected power to module 10 from the computer power supply.

A keyboard 32 is connected to computer 30 for entry of commands. A printer 34 permits printout of records of key usage as will be described hereinafter. In accordance with the invention, a user of the system is required to have an authorization code to be entered into computer 30 at each use. Such entry may be by keyboard 32, or, alternatively, a magnetic card reader 36 may be provided, and each user provided with a magnetic card 37.

Although the invention will be described with reference to a key storage and control system, it is to be understood that the system and method are equally applicable to other articles.

Computer 30 is programmed to receive data from the electronics of module 10 and to place the data in permanent storage on a hard disk. The program also formats reports of the system usage and permits printouts to authorized persons. Details of the program are presented herein below.

Figures 2, 3:
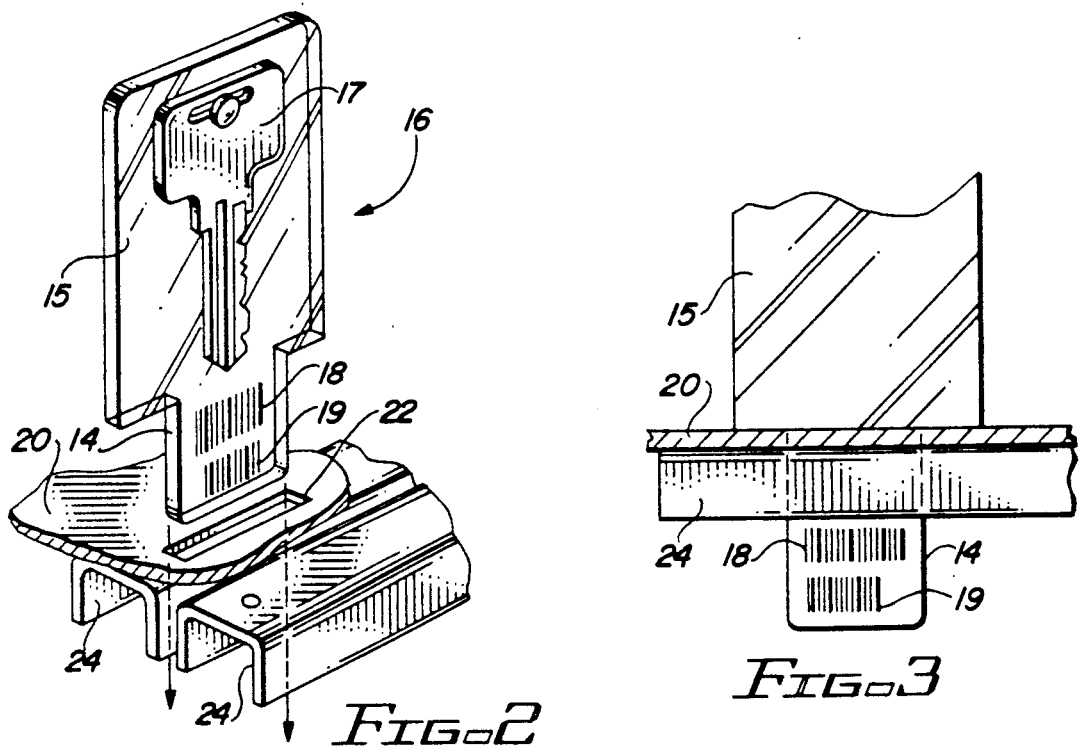
FIG. 2 is a perspective view of a key card, and a partial view of a card-receiving slot and guide of the drawer shelf of FIG. 1.
FIG. 3 is a partial view of the drawer shelf with the key card of FIG. 2 inserted therethrough.

Turning now to FIG. 2, details of the key card 16 are illustrated. Card 16 includes a body portion 15 and a narrow tab 14, formed from a transparent plastic. A key 17 is semi-permanently attached to body portion 15. A bar code 19 and self-clocking bar pattern 18, which may be imprinted on a thin, transparent film, is attached to tab 14.

A portion of drawer shelf 20 is shown having a slot 22 therethrough with dimensions to accept tab 14. When key card 16 is inserted through slot 22, the shoulders of body 15 rest on shelf 20. Vertical support and guide rails 24 hold the inserted vertically oriented key card 16 firmly in place. FIG. 3 illustrates card 16 inserted through slot 22 such that the bar code 19 and clocking bar pattern 18 project below rails 24.

FIG. 4 is a partial top view of drawer 12 showing a preferred layout of slots 22. In one embodiment of the invention, a 15 by 16 matrix of slots 22 is used which holds 240 keys in one drawer. It is to be understood that the size of the matrix is a design choice. The slot location is identified by any convenient numbering system; for example, in FIG. 4, columns are numbered consecutively from left-to-right, and rows are indicated by letters of the alphabet. Thus, a slot is located by a number-letter code.

FIG. 5 is a view of a module 10 with the drawer front removed and shelf 20 cut away to expose portions of an optical-electronics board 46. As best seen in FIG. 6, board 46 is mounted to case 13 by a set of springs 41, posts 33, and slots 43 such that about 0.25 inches of left-to-right motion is permitted. A pair of horizontal rollers 42 at each corner of board 46 contacts the lower side of a drawer shelf guide rail 24 as best seen in FIG. 7. A pair of vertical rollers 44, mounted on board 46 between slot groups, ride in guides 43 as drawer 12 and shelf 20 are being opened or closed. As will be recognized, the spring mounting of electronics board 46 permits the board to follow slight lateral or vertical movements of drawer shelf 20 due to normal tolerances.

An electrically operated lock 49 holds drawer 12 closed for normal storage and is released when the computer 30 receives an authorized access request. A key 47 and mechanical over-ride lock 45 may be provided for use in the event of computer malfunction.

FIGS. 6 and 7 illustrate the method for generating data indicative of the drawer shelf 20 position Optical sensors 39, 50 and 51 are mounted to opto-electronics board 46. An optical film grating 54 is attached to one of the guide rails 24 of drawer shelf 20 (not shown). The film grating 54 is transparent except for an opaque region at one end. The grating 54 moves through optical sensor 39 when the drawer 12 is opened or closed. When the drawer 12 is fully closed, the opaque region interposes the beam of sensor 39 signaling computer 30 to engage the electrical lock 49 of FIG. 5.

Optical film grating 53 is attached to a guide rail 24. The pair of optical sensors 50 and 51 is mounted on board 46 such that optical film grating 53 moves through the sensors when drawer 12 is opened or closed. Grating 53 has a periodic transparent and dark bar pattern 52 along its entire length. The spacings between sensors 50 and 51 are selected to be one and one-half bar pattern segment widths apart. Sensor 51 generates a position clock signal by clocking an electronic counter in position logic circuit 35. The direction of counting is determined by the output of sensor 50 at the time the position clock signal from sensor 51 changes; the process known in the art as a "quadrative position measurement." FIG. 7 shows a cross-sectional view of case 13 and shelf 20 with film grating 53 attached to a guide rail 24.

The dual track bar codes on key cards 16 are read by optical readers mounted on bracket 48 along the front edge of electronics board 46 as seen in FIG. 5. Details of the optical readers are shown in FIGS. 8 and 9. A transmissive bar code system is used with a transparent key card body 15 having opaque code patterns 18 and 19. Photo LEDs 61 and 62 produce a small diameter beam which is received by photo receiver devices 63 and 64. The beams 35 and 38 are shown in FIG. 9 and FIG. 10. The small size of beams 35 and 38 permit variations in position of tab 14 and code bars without affecting the reading process. The upper beam from LED 61 is broken by self-clocking track bars 18 when drawer 12 is being opened or closed. As indicated in the simplified schematic of FIG. 11, a clock pulse train 65 is produced by receiver 63 which is squared by buffers 70 and applied to pulser 66 producing a clock pulse for each leading and trailing edge. As bar code 19 is scanned, the clock pulses clock the D input of flip-flop 67. When a bar code pulse is produced by receiver 64, the pulse is squared and applied to the clocked D input of flip-flop 67. Thus, as key card 16 is moved through the reader beams 35, 38, a serial data signal and a synchronous clock signal is produced on output leads 68 and 69 for interpretation by computer 30. The key card data signal may be 22 bits of which 15 are for card indentification, 5 for a cyclic redundancy check and the remainder for synchronization as is well known in the art. Since bar code 19 is self-clocking, mechanical skew errors across a drawer as it manually moved will not cause any errors, and the data recovery means is not dependent upon the speed of drawer movement.

Although the above description uses a single storage module 10 for exemplary purposes, any desired number may be used. In a preferred embodiment of the invention fifteen modules 10 are provided. Each module is provided with an address which, when received, applies power to that module. Each module includes an indicator, such as an LED, which indicates to a user the drawer containing a requested key.

Figure 12:
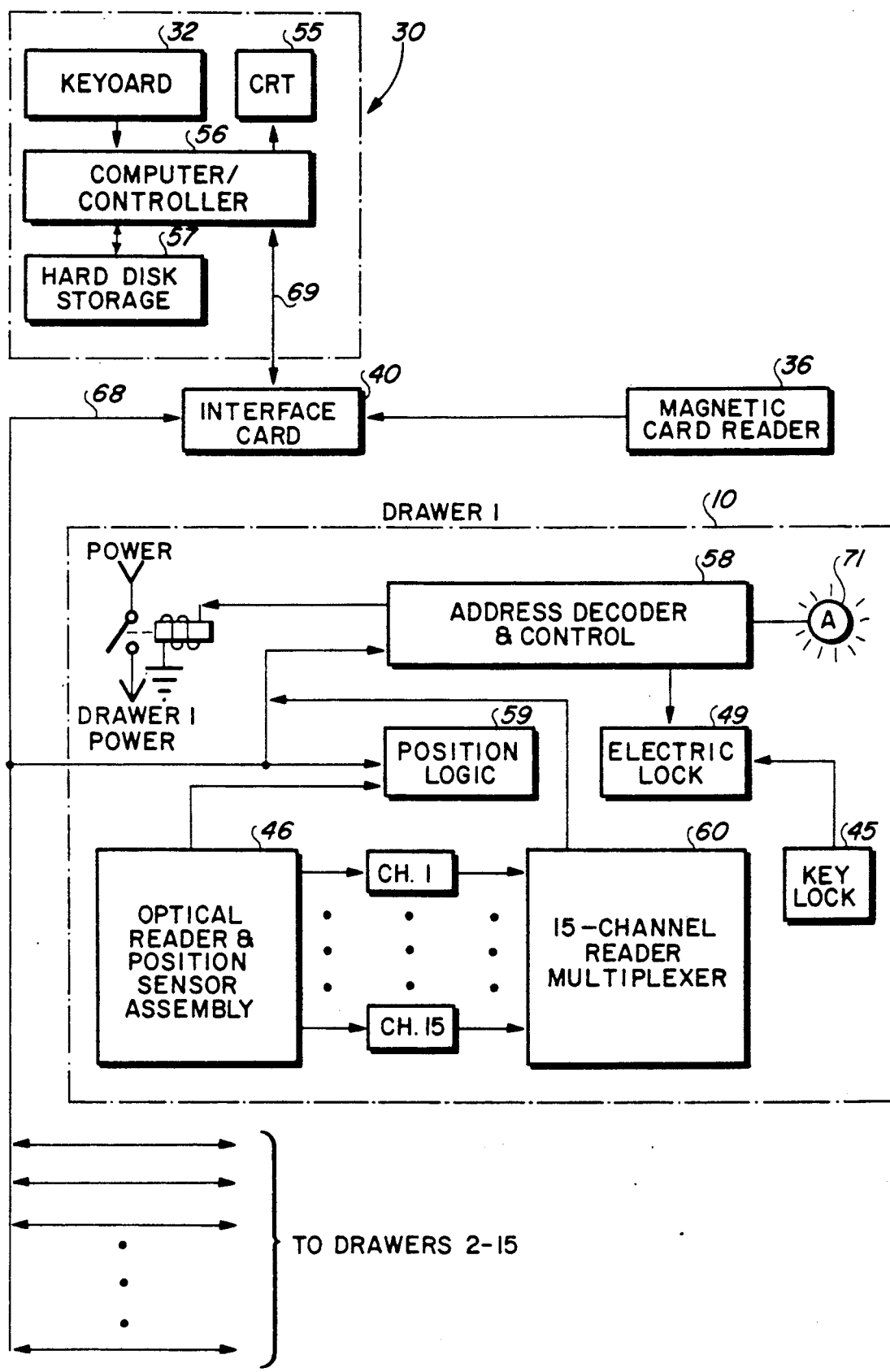
FIG. 12 is a block diagram of a complete system in accordance with invention.

FIG. 12 is a functional block diagram of this preferred embodiment. As will be noted from FIG. 4, 15 columns of slots are used, requiring 15 optical readers. A 15 channel reader multiplexer 60 serves to economically upload outputs 68, 69 from each optical reader on board 46 and from the position sensors to interface card 40 and computer/controller 56. Any of the 15 drawers indicated may be addressed by the computer and power is applied to the desired drawer by its address decoder and control 58. An indicator lamp 71 on the selected drawer is lighted to alert the user.

The system of the invention may be implemented at a lower cost than known prior art systems. A module utilizes relatively low cost semi-conductors and a minimum of mechanical elements. PC style computers having very large storage and memory are presently available at low cost.

Figure 13:
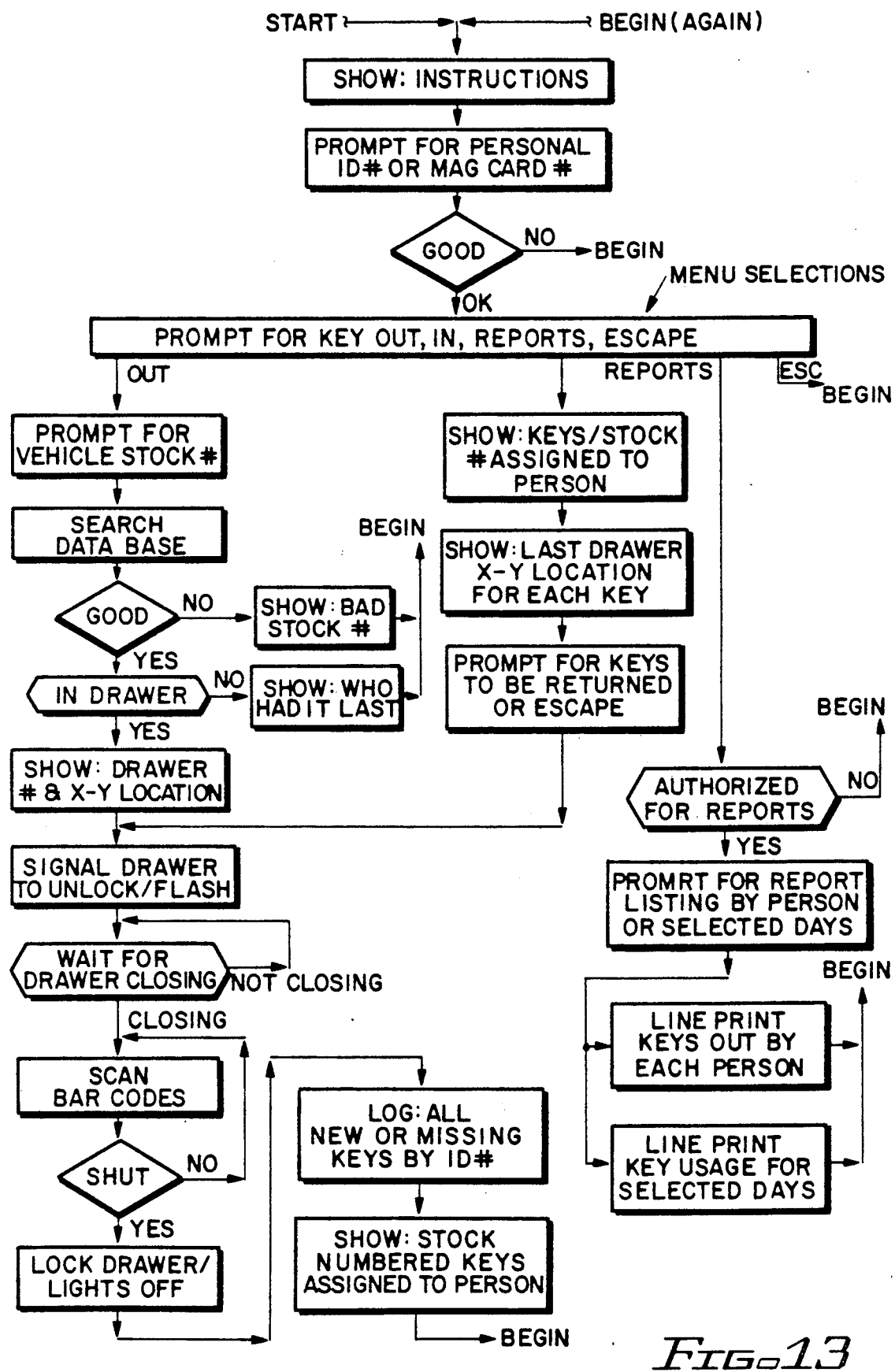
FIG. 13 is a simplified flow diagram of the method of the invention.

FIG. 13 is a simplified flow diagram of the control algorithm of the invention. The following definitions apply to the flow diagram:

SHOW: information is displayed on the CRT 55 for user instruction and information.

PROMPT: a request for action by the user is displayed on the CRT 55 and computer 56 awaits a keyboard command from the user. This command is then acted upon.

SCAN: the active process whereby the computer/controller 56 continuously reads bar code information from the selected drawer module 10 along with its position information, stores it in its memory 57 where it is further interpreted as vehicle stock numbers.

LOG: the computer information handling process whereby vehicle information is placed into or updates the stored data base resident in the hard disk 57.

As will be noted in FIG. 13, the main menu permits four activities by the user: taking out a key; replacing a key; printing out a report; and returning to the instruction show screen. It is also apparent from the flow diagram of FIG. 13 that an unauthorized person cannot open a drawer and only authorized identification numbers can access reports Removal of wrong keys or too many keys will result in logging those keys to the user. Keys may be replaced in any available open slot in any drawer and the location will be logged by the computer as the drawer is closed.

As will be appreciated by those skilled in the art, the system and method described above provides a compact, low cost means for storing, controlling and inventorying keys and similar articles. The system permits storing and controlling a very large number of keys or similar articles in a small space, resulting in a low cost per article.

The system has been described with reference to specific embodiments for exemplary purposes only. Many variations may be made in such embodiments without departing from the spirit and scope of the invention.

What is claimed is:

1. A system for storing and monitoring keys or similar articles comprising:
   a storage module;
   a drawer in the module movable to open and closed positions;
   a shelf disposed in the drawer having a plurality of slots therethrough, each of the slots having a unique code indicative of its location on the shelf;
   a plurality of cards, each of said cards having attachment means for an article to be stored and formed to permit insertion of the card in any of the slots;
   a unique dual track bar code pattern on each of the cards indicative of an identification number thereof;
   bar code reader means disposed in the module;
   a drawer position code pattern attached to the shelf;
   position code pattern reader means disposed in the module;
   data processing and storing means for receiving electrical data from the bar code reader means, and from said code pattern reader means when the drawer is being opened or closed causing the bar code patterns of the card to be scanned by the bar code reader means and the drawer position code pattern to be scanned by the positions code pattern reader means, the electrical data processed to store the identification number of each of the cards with its slot location to thereby provide a current inventory of stored articles.

2. The system for storing and monitoring articles recited in claim 1 which further comprises:
   means connected to the data processing and storing means for entering an authorization code of a user;
   means connected to the data processing and storing means for entering an identification number of a specific stored article;
   display means connected to the data processing and storing means for displaying the slot location of the requested article; and
   means for recording and storing the identity of the user and the identification number of removed articles.

3. The system for storing and monitoring articles recited in claim 2 in which the entering means is a keyboard.

4. The system for storing and monitoring articles recited in claim 2 in which the entering means is a keyboard and a magnetic card reader.

5. The system for storing and monitoring articles recited in claim 2 in which the storage module includes an electric lock for locking the drawer in a closed position, the lock having means for unlocking when the data processing means receives a valid authorization code.

6. The system for storing and monitoring articles recited in claim 1 in which:
   the cards are transparent; and
   the bar code reader means is a transmissive type.

7. The system for storing and monitoring articles recited in claim 1 in which the drawer position code pattern and the code pattern reader means form a quadrative position measurement system.

8. The system for storing and monitoring articles recited in claim 1 in which the bar code pattern includes a set of self-clocking bars in a first track, and a set of bar code segments in a second track.

9. The system for storing and monitoring articles recited in claim 8 in which the bar code reader means includes:
   a first reader for reading the self-clocking bars thereby producing a clock pulse train;
   a second reader for reading the bar code segments thereby producing bar code pulses; and
   means for receiving the clock pulse train and the bar code pulses to provide a serial data signal output and a synchronous clock signal output.

10. The system for storing and monitoring articles recited in claim 1 in which the drawer position code patterns and the position code pattern reader means include:
    a first optical grating having a pattern of alternating bars of equal width;
    a pair of readers for reading the first grating pattern, the spacing therebetween being equal to one and one-half bar widths of the pattern bars; and
    a position clock operated by pulse from a first one of the readers for counting the grating bars, the direction of counting determined by the output from a second one of the readers at the time the pulse from the first reader changes.

11. The system for storing and monitoring articles recited in claim 10 in which the drawer position code pattern further includes:
    a second optical grating having a single bar at one end thereof;
    an optical reader for reading the second grating, the reader disposed to detect the second grating when the drawer is fully closed, thereby producing a drawer-locking output signal.

12. A secure storage system for keys or similar articles for providing access only to authorized personnel, for automatically maintaining an inventory of available keys and the locations thereof, and records of withdrawal and return of keys by authorized personnel, comprising:
    a computer having input means, permanent data storage means, and display means;
    at least one storage module for storing a plurality of articles, the module having an electrically operated lock;
    a drawer in the module movable between open and closed positions, the drawer having a shelf, the shelf including a plurality of slots in which each slot has a location code;
    a plurality of key cards, each card having means for attaching an article and formed to be inserted in the shelf slots;
    a dual track unique bar code pattern attached to each of said cards, a first track thereof for producing a clock signal, and a second track thereof for producing an article identification number;

a set of optical readers disposed in the module adjacent a front end of said shelf and positioned to read the dual track code pattern of each card stored in the slots as the drawer is opened and closed, thereby producing a bar code signal and a synchronous clock signal from each of the cards;

a drawer position code pattern attached to the drawer;

optical reading means for reading the drawer position code pattern thereby producing a signal indicative of the drawer position with respect to the dual track readers as the drawer is being opened and closed;

interface means for interfacing the dual track readers and the optical reading means with the computer;

means including the computer and the data storage means for storing each identification number and the location code of the storage slot for each article, and for updating such data at each opening and closing of the drawer;

the computer having input means for entering an authorization code from an authorized user at each withdrawal or return of an article, and for entering by such user the identification number of an article to be withdrawn, the computer releasing the lock when an authorized code is entered;

the display means for providing instructions to a user, and for displaying a slot location of a requested article;

the programming means programming the computer to store in the data storage the identity of each user entering an authorization code, the identification code of each article removed from the storage module, each article returned to the storage module, and times of each use of the system; and printer means connected to the computer for printing reports of data stored in the data storage means.

13. A system for storing and monitoring articles, comprising:

a storage module;

a drawer in the storage module movable between open and closed positions, the drawer having a plurality of storage locations therein, each of the storage locations having unique code indicative of its location in the drawer;

a plurality of elements, each of the elements being attached to an article to be stored, and formed to permit insertion in any of the storage locations;

a unique element recognition code on each of the elements indicative of an identification number thereof;

an element recognition code reader means disposed in the module;

a drawer position code attached with the drawer;

a drawer position code reader means disposed in the module;

data processing and storing means for receiving electrical data from the element recognition code reader means and from said drawer position code reader means when the drawer is in the process of either being opened or closed causing the recognition codes of the elements to be scanned by the element recognition code reader means and the drawer position code to be scanned by the drawer position code reader means, the electrical data processed to store the identification number of each of the elements with its current storage location to thereby provide a current inventory of stored articles.

14. A secure storage system for articles to provide access only to authorized personnel, for automatically maintaining an inventory of available articles and the locations thereof, and records of withdrawal and return of articles by authorized personnel, comprising:

a computer having input means, data storage means and display means;

at least one storage module for storing a plurality of articles, the module having a computer-controlled lock;

a drawer in the module movable between open and closed positions, the drawer including a plurality of storage locations in which each storage location has a location code;

a plurality of elements, each element having means for attaching an article and formed to be inserted into one of the storage locations;

a unique dual track element recognition code attached to each of the elements, a first track thereof for producing a clock signal and a second track thereof for producing an article identification number;

a set of readers disposed in the module adjacent a front end of the drawer and positioned to read the dual track code of each element in the storage locations when the drawer is in the process of being opened or closed, thereby producing a code signal and a synchronous clock signal from each of the elements;

a drawer position code attached to the drawer;

drawer position reading means for reading the drawer position code, thereby producing a signal indicative of the drawer position with respect to the dual track readers as the drawer is in the process of being opened and closed; and interface means for interfacing the dual track readers and the optical reading means with the computer.

* * * * *

UNITED STATES PATENT AND TRADEMARK OFFICE
CERTIFICATE OF CORRECTION

PATENT NO.   : 5,038,023
DATED        : August 6, 1991
INVENTOR(S)  : Thomas V. Saliga It is certified that error appears in the above-identified patent and that said Letters Patent is hereby corrected as shown below:

On the title page:

In the Assignee: Delete "C. Itoh Information Systems Development, Inc. of Tokyo, Japan" and insert --Key-Trak, Inc., Oviedo, Florida.--

Signed and Sealed this

Twenty-eighth Day of July, 1992

Attest:

DOUGLAS B. COMER

Attesting Officer

Acting Commissioner of Patents and Trademarks